United States Patent [19]

Baer

[11] Patent Number: 5,304,101

[45] Date of Patent: Apr. 19, 1994

[54] SHAFT MOUNTABLE BUSHING AND HUB FOR INDUSTRIAL POWER TRANSMISSIONS

[75] Inventor: Lewis E. Baer, Chambersburg, Pa.

[73] Assignee: T. B. Wood's Sons Company, Chambersburg, Pa.

[21] Appl. No.: 919,223

[22] Filed: Jul. 27, 1992

[51] Int. Cl.⁵ .............................................. F16H 7/00
[52] U.S. Cl. ...................................... 474/170; 474/95
[58] Field of Search ................... 474/95, 170, 902, 903

[56] References Cited

U.S. PATENT DOCUMENTS

| | | | |
|---|---|---|---|
| 2,269,821 | 1/1942 | Kemphert et al. | 474/95 X |
| 2,402,743 | 6/1946 | Firth | 474/170 X |
| 2,417,467 | 3/1947 | Bryant, Jr. | 474/170 |

*Primary Examiner*—Thuy M. Bui
*Attorney, Agent, or Firm*—Frank S. Troidl

[57] ABSTRACT

A bushing and hub assembly are clamped together and clamped on a shaft by passing screws through an annular flange provided on the hub and into threaded openings in the bushing. The outside of the bushing is tapered and the inside bore of the hub has a taper which mates with the tapered outside of the bushing.

3 Claims, 2 Drawing Sheets ns in the flange, the openings in the bushing would also be threaded. However, it is preferred to thread only the openings in the bushing or only the openings in the flange to avoid jamming of the threads of the bushing against the threads of the flange.

SHAFT MOUNTABLE BUSHING AND HUB FOR INDUSTRIAL POWER TRANSMISSIONS

BACKGROUND OF THE INVENTION

1. Field of the Invention

This invention relates to industrial power transmission apparatus. More particularly, this invention is a new bushing and hub structure which is mountable upon a shaft and can easily be removed from the shaft.

2. Description of the Prior Art

A currently manufactured bushing and hub is described in U.S. Pat. No. 2,269,821 dated Jan. 13, 1942 issued to W. W. Kemphert et al. and entitled "SHEAVE." The bushing described in Kemphert et al. includes a bushing with an integral flange. The bushing is tapered on the outside diameter and contains a concentric, cylindrical bore. The integral flange is located at the largest outside diameter of the taper. The flange contains a number of cap screw holes which are used to pull the bushing into a mating hub. The entire bushing is sawed through or split on one side so the bushing will close in on a shaft and clamp to it as the bushing is pulled into the mating taper of the hub.

Newer drive systems using more compact components than previously used often do not afford enough space for the use of a flanged type bushing such as shown in the Kemphert et al. U.S. Pat. No. 2,269,821. These same drives transmit relatively high torques. Therefore, any more compact hub and bushing than the bushing and hub described in the Kemphert et al. patent must not only be compact enough to fit into the newer drive systems of today, but must also be capable of transmitting relatively high torques.

A bushing and hub arrangement which is more compact than the bushing and hub arrangement of Kemphert et al. is described in U.S. Pat. No. 2,402,743 dated Jun. 25, 1946 issued to Firth and entitled "MOUNTING FOR SHEAVES, ETC." Since the Firth structure has no flange, the bushing is pulled into place using several set screws and threaded holes which are located half in the bushing and half in the hub. However, even though the set screw itself acts as a shear bearing member between the bushing and the hub, the forces pulling the bushing into the mating hub and the clamping forces on the shaft are very limited. The forces are limited because neither the threads in the bushing nor the threads in the hub have a full circumference of threads around the set screws.

For newer drive systems a split tapered bushing system which is more compact than the currently manufactured Kemphert et al. hub and bushing but still has the same force magnitude as the Kemphert et al. type hub and bushing to withstand the relatively high torques transmitted by the newer drive systems would obviously be highly desirable.

My invention is a new split tapered bushing system for use in power transmission systems which is more compact than the currently manufactured flanged bushings of the type shown in the Kemphert et al patent and yet provides sufficient clamping ability to be used with the newer drive systems which transmit relatively high torques.

SUMMARY OF THE INVENTION

Briefly described, my new shaft mountable structure comprises a bushing having a longitudinally extending tapered outer surface. The bushing is split longitudinally on one of its radii to allow easy mounting upon a shaft. The bushing is provided with a plurality of openings for receiving screws. The bushing has means for locating the bushing and a mating hub upon a shaft. The bushing engaging hub has a tapered bore for fitting over the tapered outer surface of the bushing and a radially inwardly extending annular flange. The annular flange has openings for receiving screws. Either the openings in the bushing or the openings in the annular flange are threaded so that screws placed in the openings are threaded into the threaded openings to draw the hub on the bushing and provide a press fit of the hub upon a shaft.

BRIEF DESCRIPTION OF THE DRAWINGS

The invention, as well as its many advantages, may be further understood by reference to the following detailed description and drawings in which.

DESCRIPTION OF THE PREFERRED EMBODIMENT

In the various figures, like parts are referred to by like numbers.

Figure 2:
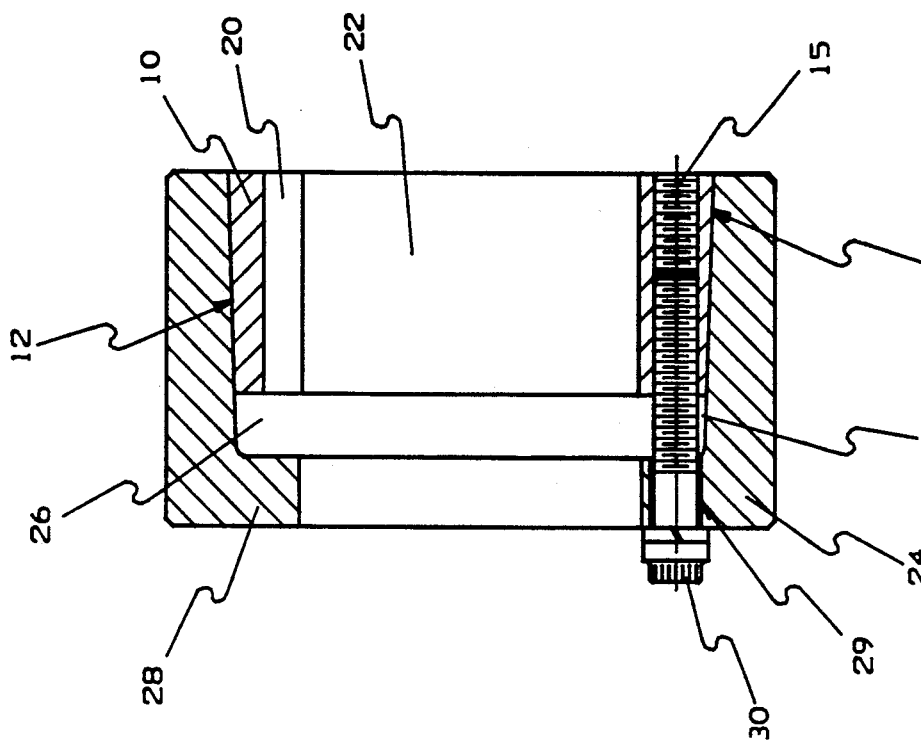
FIG. 2 is a sectional view taken along lines 2—2 of FIG. 1.
Figure 1:
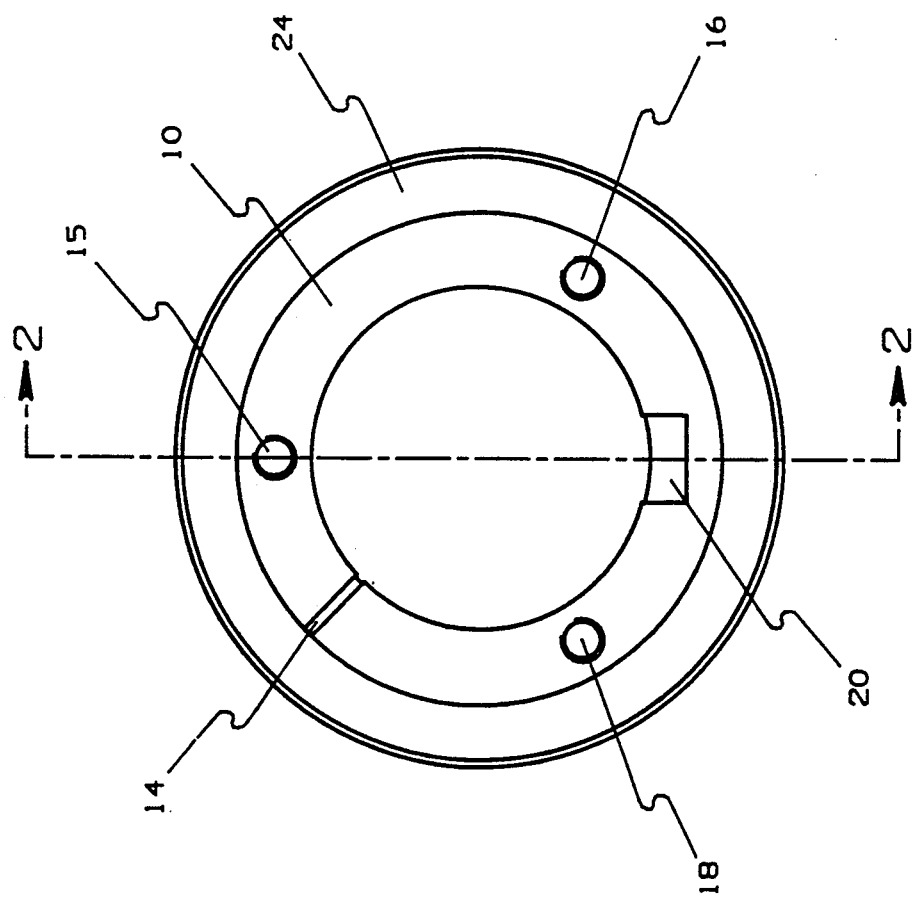
FIG. 1 is a front end elevational view of a preferred embodiment of the invention.

Referring to the drawings, and more particularly to FIG. 1 and FIG. 2, a bushing, 10, has a longitudinally extending tapered outer surface, 12, (see FIG. 2). The bushing, 10, has a longitudinally extending split, 14, (see FIG. 1). The split is formed on one of the bushing's radii to allow easy mounting upon a shaft. In the embodiment shown, substantially the entire outer surface of the bushing is tapered. The bushing, 10, is provided with a plurality of circumferentially separated threaded openings, 15, 16, and 18, for receiving screws.

A longitudinally extending keyway, 20, is adapted to fit on a key of a shaft (not shown) when the shaft is placed through the bushing bore, 22.

A hub, 24, is provided with a tapered bore, 26, (see FIG. 2) for fitting over the tapered outer surface, 12, of the bushing, 10. A radially inwardly extending annular flange, 28, is provided at the hub tapered bore smallest inside diameter. The annular flange, 28, has a plurality of circumferentially separated openings extending therethrough and facing the openings, 15, 16, and 18, in the bushing, 10. Only one of the openings, 29, (see FIG. 2) which faces the opening, 15 in the bushing, 10, is shown in the figures.

Figure 3:
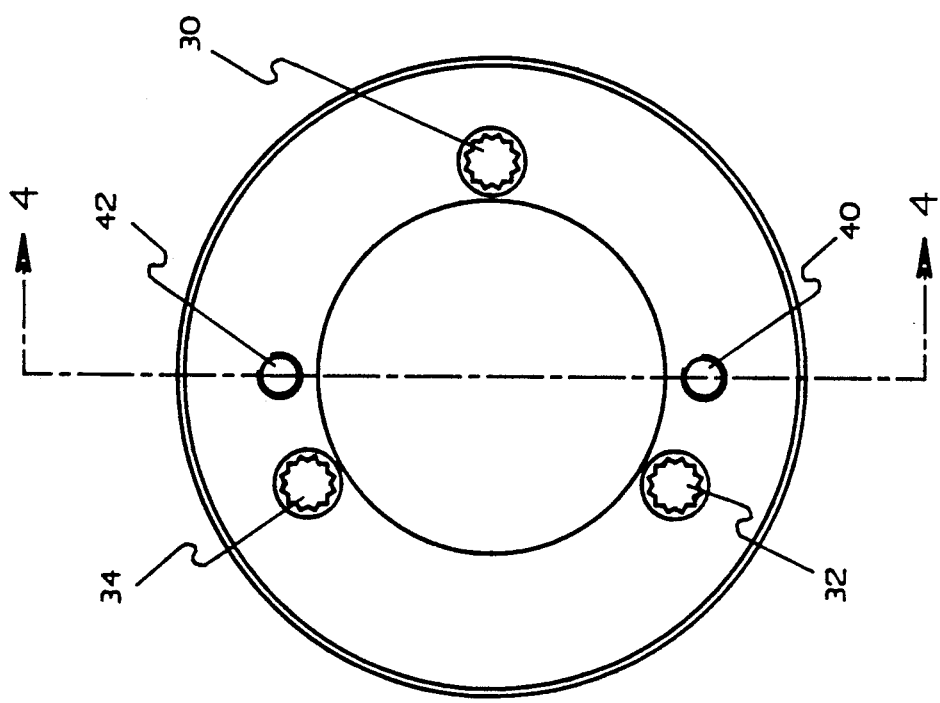
FIG. 3 is a back end elevational view of the preferred embodiment of FIG. 1.

Note that the openings, 15, 16, and 18, are completely enclosed threaded openings for receiving the screws. Therefore, the threads in these openings extend around the entire circumference of the opening. The openings in the flange, 28, are not threaded. Referring to FIG. 2 and FIG. 3, the screws, 30, 32, and 34, are received by the openings in the annular flange, 28, and the threaded openings, 15, 16, and 18, in the bushing, 10. The screws draw the hub into engagement with the bushing and provide a press fit of the hub and bushing upon the shaft. If it is required or desired to press fit the hub and bushing by feeding the screws first through the openings in the bushing rather than first through the openings in the hub annular flange, this can be accomplished by providing no threads in the bushing openings and threading the hub annular flange openings.

Figure 4:
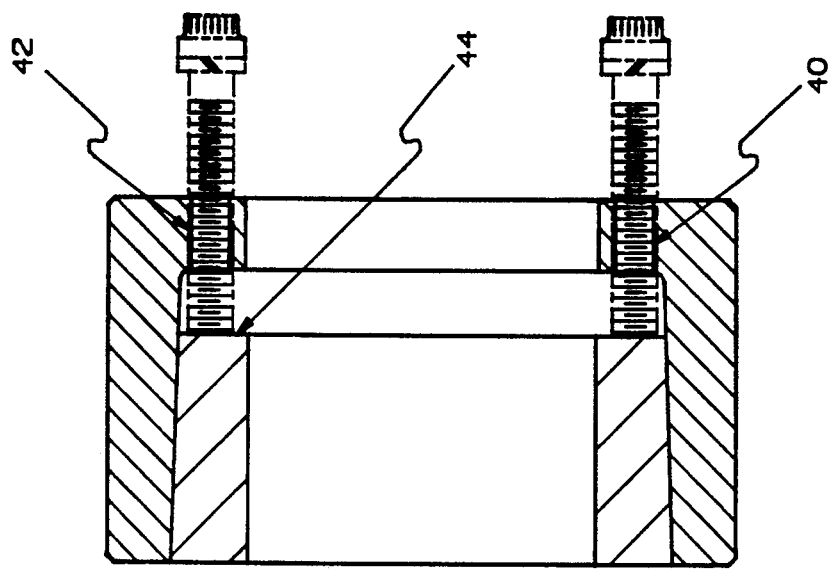
FIG. 4 is a sectional view taken along lines 4—4 of FIG. 3.

The way the assembly is forced apart is illustrated in FIG. 3 and FIG. 4. Two threaded holes are provided in the hub annular flange, 28. In the embodiment shown in FIG. 3 and FIG. 4, a pair of circumferentially separated threaded holes, 40 and 42, are provided.

To force the assembly apart, the screws used to clamp the bushing and hub assembly firmly on the shaft may be used to force the assembly apart. However, if desired separate screws may be used. In the embodiment shown in FIG. 3 and FIG. 4 screws which have been removed from threaded openings in bushing, 10, (see FIG. 2) have been inserted into the threaded holes, 40 and 42, in FIG. 4. The inner ends of the bolts press against the radially extending end surface, 44, of the bushing, 10, to remove the bushing from the hub.

I claim:

1. A shaft mountable structure comprising: a bushing having a longitudinally extending outer surface and split longitudinally on one of its radii to allow easy mounting upon a shaft, the bushing being provided with a plurality of openings for receiving screws; means for clamping the bushing in fixed position upon the shaft; a bushing engaging hub having a tapered bore for fitting over the tapered outer surface of the bushing, the hub having a radially inwardly extending annular flange, the annular flange having openings, either the openings in the bushing or the openings in the annular flange being threaded to receive screws for threading into the threaded openings to draw the hub upon the bushing and provide a press fit of the hub upon a shaft.

2. A shaft mountable structure in accordance with claim 1 wherein: substantially the entire outer surface of the bushing is tapered.

3. A shaft mountable structure comprising: a bushing having a bore and substantially its entire outer surface tapering longitudinally; the bushing being split longitudinally on one of its radii to allow easy mounting upon a shaft, the bushing being provided at its smallest outside diameter end with a plurality of circumferentially separated completely enclosed threaded openings for receiving screws; means for clamping the bushing in fixed position upon the shaft; a bushing engaging hub having a tapered bore for fitting over the tapered outer surface of the bushing, the hub having a radially inwardly extending annular flange at the hub tapered bore smallest inside diameter; the annular flange having circumferentially separated unthreaded openings facing the bushing threaded openings for receiving screws for threading into the threaded openings in the bushing to draw the hub upon the bushing and provide a press fit of the hub upon a shaft; said hub annular flange also having longitudinally extending threaded openings facing the radially extending end surface of the bushing to receive screws which press against the radially extending end surface of the bushing to remove the bushing from the hub.

* * * * *